June 12, 1934.  E. F. PAWSAT  1,962,835
SPARE WHEEL AND TIRE CARRIER
Filed June 30, 1932
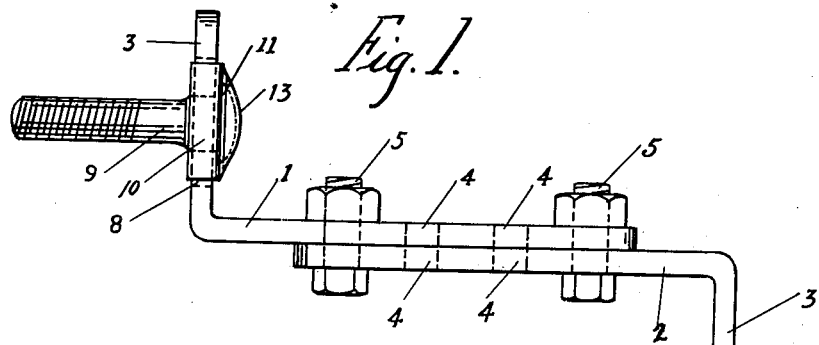
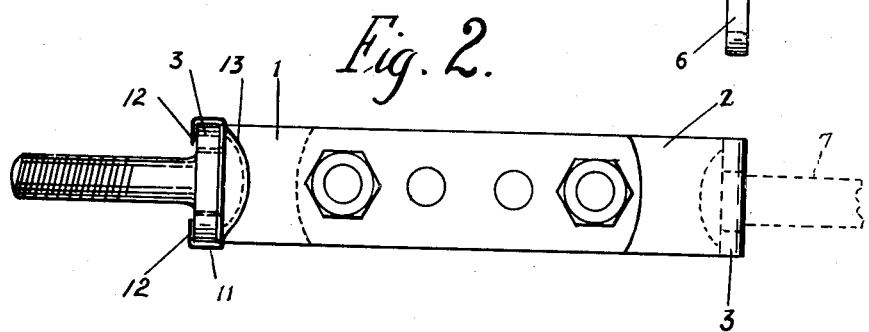
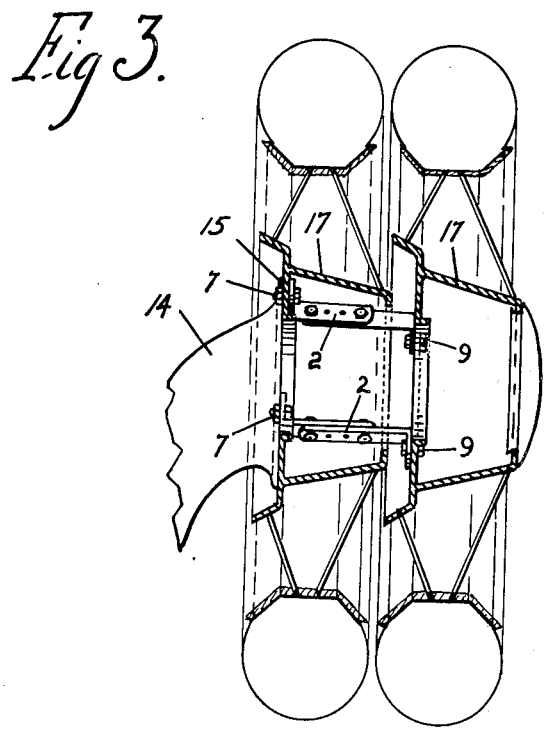
Inventor
Ewald F. Pawsat,
By Arthur H. Ewald,
Attorney.

Patented June 12, 1934

1,962,835

UNITED STATES PATENT OFFICE 1,962,835

SPARE WHEEL AND TIRE CARRIER

Ewald F. Pawsat, Maysville, Ky., assignor to Wald Manufacturing Company, a corporation of Kentucky Application June 30, 1932, Serial No. 620,079

1 Claim. (Cl. 224—29)

My invention relates to carriers for spare wheels and tires of automobiles, and has reference particularly to the provision of means for the carrying of spare wheels and tires in addition to the one provided for by the usual bracket furnished on a motor vehicle.

In equipping automobiles at the factory, according to current practice, a bracket is provided usually at the rear of the car, arranged for the support of a spare wheel and tire, instead of as formerly, providing merely for an additional rim and tire. In use, especially when taking long trips, it is highly desirable to carry at least one additional spare wheel and tire so that road emergencies may be met with a minimum of inconvenience.

The principal object of the present invention is to provide a simple, inexpensive and efficient means for carrying one or more additional spare wheels and tires, the same to be supported and carried by the bracket provided by the manufacturer on the vehicle.

A further object of my invention is to provide means of the character mentioned which are adjustable so as to be adapted to variations in the form and attaching means of such spare equipment.

Further objects of my invention will appear from the following detailed description thereof.

In the drawing:

Figure 1 is a side elevation of a device constructed in accordance with this invention.

Figure 2 is a top view of said invention.

Figure 3 is a sectional view of the spare wheel and tire equipment as carried by the usual vehicle support and my newly invented device.

The numerals 1 and 2 indicate two metal bars of rigid construction each being provided with an end extension 3 at right angles to the main portion thereof. The bars 1 and 2 are provided with series of perforations 4—4 which are adapted to register and to receive bolts 5—5 for securing together the bars 1 and 2, the selective arrangement of perforation registration providing for the adjustable extension of the bars in assembly. The angular extension 3 of the bar 2 is provided with a perforation 6 for a bolt or screw 7. The angular extension 3 of bar 1 is provided with a slot 8 through which a bolt 9 is adapted to extend, the square section 10 of said bolt being slidable in said slot and preventing the bolt from turning therein. The bolt 9 is secured in the slot by means of a plate 11 which has flanges 12—12 which fit around the sides of extension 3 to secure said plate slidably on the extension; said plate is provided with a cupped portion 13 adapted to fit over the head of the bolt.

In Figure 3 I have shown the application and use of the device as above described. In said figure the numeral 14 indicates the usual tire support, the flange 15 thereof being provided with perforations for bolts 7 by means of which the hub 17 of a spare wheel is secured to the support in the usual manner. In the use of my device, after the hub 17 of the first wheel has been placed with its perforations on the bolts 7, the perforations 6 of extensions 3 of a series of said devices, preferably 3, are placed over the bolts 7 and secured. The bars 1 and 2 are then, or have preferably previously been, adjusted by means of the perforations 4—4 and bolts 5—5, so that the extensions 3 of bars 1 reach beyond the hub 17 of said wheel. The hub 17 of a second spare wheel is then mounted on the bolts 9 and secured in the usual manner.

As will be understood, additional spare wheels may be mounted merely by providing additional sets of the extension bars 1 and 2 which can be secured in series as will be obvious to those skilled in the art to which this invention appertains.

By reason of the adjustability of the bars 1 and 2, it will be apparent that the device may be attached to wheels of varying sizes, and the slidability of the bolts 9 in the slot 8 will obviate all difficulty in obtaining registration of said bolts with the perforations of the succeeding hub. Instead of the perforations 4—4 it is also obvious that the bars 1 and 2 may be provided with slots through which the securing bolts 5—5 extend, which construction will give greater latitude of adjustment but require greater care in securing the bolts to prevent slippage.

Having thus fully described my invention, what I claim as new and desire to secure by Letters Patent is:

In combination with a support for a spare wheel provided with bolts for securing said wheel through its hub bolt perforations, a plurality of bars, one end of each of said bars having a perforation whereby it is arranged to be secured to one of said support bolts, a plurality of second bars, means whereby each of said second bars may be secured to one of said first mentioned bars so that the assembled pairs of bars are adjustable as to length to extend through the hub of a second wheel, angular extensions on the free ends of said second bars, bolts movably secured in said extensions and adjustable radially therein relative to the hub of said second wheel, whereby said bolts are arranged to enter the hub perforations of said second wheel, and securing nuts for said bolts.

EWALD F. PAWSAT.